(12) United States Patent
Yasunaga

(10) Patent No.: US 10,690,637 B2
(45) Date of Patent: Jun. 23, 2020

(54) AUTOSAMPLER AND LIQUID CHROMATOGRAPH

(71) Applicant: SHIMADZU CORPORATION, Kyoto (JP)

(72) Inventor: Kenichi Yasunaga, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 324 days.

(21) Appl. No.: 15/735,801

(22) PCT Filed: Jul. 6, 2015

(86) PCT No.: PCT/JP2015/069389
§ 371 (c)(1),
(2) Date: Dec. 12, 2017

(87) PCT Pub. No.: WO2017/006410
PCT Pub. Date: Jan. 12, 2017

(65) Prior Publication Data
US 2020/0033302 A1    Jan. 30, 2020

(51) Int. Cl.
*G01N 30/22* (2006.01)
*G01N 30/24* (2006.01)
*G01N 30/26* (2006.01)
*G01N 30/20* (2006.01)

(52) U.S. Cl.
CPC ............ *G01N 30/22* (2013.01); *G01N 30/24* (2013.01); *G01N 30/26* (2013.01); *G01N 2030/202* (2013.01)

(58) Field of Classification Search
CPC ......... G01N 30/22; G01N 30/24; G01N 30/26
USPC ...................................... 73/61.55
See application file for complete search history.

(56) References Cited

U.S. PATENT DOCUMENTS

2011/0209532 A1    9/2011  Maeda
2012/0132013 A1*   5/2012  Glatz ................. G01N 30/20
                                              73/863.02

FOREIGN PATENT DOCUMENTS

| CN | 202153221 U | 2/2012 |
| JP | 2005-121384 A | 5/2005 |
| JP | 2007-327846 A | 12/2007 |
| JP | 2011-179826 A | 9/2011 |

(Continued)

OTHER PUBLICATIONS

International Search Report dated Oct. 6, 2015 of corresponding International application No. PCT/JP2015/069389; 2 pgs.

*Primary Examiner* — John Fitzgerald
*Assistant Examiner* — Rodney T Frank
(74) *Attorney, Agent, or Firm* — Maier & Maier, PLLC

(57) ABSTRACT

An autosampler is provided with a needle, syringe pump, needle drive mechanism, sample loop, and flow path switching mechanism. The flow path switching mechanism has a plurality of solvent delivery flow paths that each deliver a different solvent, an analysis flow path that is in communication with an analysis column for separating a sample, and a plurality of connection ports to which the ends of the sample loop are individually connected, and switches, by switching the Connection state between the connection ports, to either a loading mode for connecting all the solvent delivery flow paths to the analysis flow path without interposing the sample loop or an injecting mode for interposing the sample loop between all the solvent delivery flow paths and the analysis flow path.

5 Claims, 10 Drawing Sheets

(56) References Cited

FOREIGN PATENT DOCUMENTS

| | | | |
|---|---|---|---|
| JP | 3172222 | U | 12/2011 |
| JP | 5263197 | B2 | 8/2013 |

\* cited by examiner

AUTOSAMPLER AND LIQUID CHROMATOGRAPH

TECHNICAL FIELD

The present invention relates to an autosampler automatically introducing a sample into an analysis flow path of a liquid chromatograph and a liquid chromatograph using the autosampler.

BACKGROUND ART

In analysis using a liquid chromatograph, an autosampler is used in order to automatically introduce a plurality of samples into an analysis column according to a predetermined sequence. As the autosampler, a full injection type or a partial injection type exists.

In the full injection type autosampler, a predetermined amount of a sample is sucked from a sample container using a needle connected to a syringe pump so that the sample stays inside a sample loop connected to a proximal end of the needle. Subsequently, a needle tip is inserted into an injection port provided as one port of a rotary type high-pressure valve and the high-pressure valve is selected so that a sample loop is interposed between a feeding pump feeding a moving-phase liquid and an analysis flow path communicating with an analysis column. Accordingly, the sample staying in the sample loop is carried by the moving-phase liquid from the feeding pump and is introduced into the analysis column.

In the partial injection type autosampler, a sample is sucked using a needle connected to a syringe pump and the needle is inserted into an injection port provided in a high-pressure valve so that a predetermined amount of the sample is injected into a sample loop of which both ends are connected to ports of the high-pressure valve through the injection port. Then, the high-pressure valve is selected so that the sample loop is interposed between an analysis flow path and a feeding pump feeding a moving-phase liquid. Accordingly, the sample injected into the sample loop is introduced into an analysis column.

In the analysis using the liquid chromatograph, there is known an analysis method called gradient analysis in which two or more kinds of solvents are mixed as a moving-phase liquid and are fed while a mixing concentration ratio is gradually changed (see Patent Document 1). When the gradient analysis is used, an elution time of the sample from the analysis column is controlled to sharpen a peak shape or shorten an analysis time by decreasing the sample elution time.

In the gradient analysis, there are two kinds of analysis including high-pressure gradient analysis and low-pressure gradient analysis. The high-pressure gradient analysis is a type in which one feeding pump is used for one kind of a solvent and a concentration ratio of solvents mixed by a mixer is adjusted in such a manner that flow rates of the liquids fed from the feeding pumps are controlled while a plurality of kinds of solvents are fed to the mixer at the same time. Meanwhile, the low-pressure gradient analysis is to feed a plurality of kinds of solvents by one feeding pump and a concentration ratio of solvents mixed by a mixer is adjusted by a switching timing control for a flow path switching valve provided at a front stage of the mixer. In general, when there is a need to shorten the analysis time, the high-pressure gradient analysis having a "shorter delay capacity" is used.

CITATION LIST

Patent Document

Patent Document 1: Japanese Patent No. 5263197

SUMMARY OF THE INVENTION

Technical Problem

The "delay capacity" of the high-pressure gradient analysis means the capacity existing from the mixer for mixing the solvents fed by the feeding pump to the analysis column. When the "delay capacity" is large, there is an increase in time until a gradient is reflected in the composition of the moving-phase liquid flowing in the analysis column and thus the elution speed of the sample from the analysis column decreases by the increased time. Particularly, when the flow rate of the feeding pump is small (for example, 100 µL/min or less), an increase in analysis time becomes noticeable.

Here, an object of the invention is to provide an autosampler and a liquid chromatograph having a small delay capacity in high-pressure gradient analysis and enabling short-time analysis.

Solution to Problem

An embodiment of an autosampler according to the invention includes a needle, a syringe pump, a needle drive mechanism, a sample loop, and a flow path switching mechanism. The syringe pump sucks and discharges a sample through a needle. The needle drive mechanism is used to move the needle. The sample loop is used to hold the sample sucked by the syringe pump. The flow path switching mechanism includes a plurality of solvent supply ports which are individually connected to a plurality of solvent delivery flow paths feeding different solvents without any merging, an analysis port which is connected to an analysis flow path communicating with an analysis column separating the sample, and a plurality of connection ports which include a loop one end side port connected to one end of the sample loop and switches a connection state between the connection ports to select any one of a loading mode for connecting all the solvent delivery flow paths to the analysis flow path without using the sample loop therebetween and an injecting mode for interposing the sample loop between all the solvent delivery flow paths and the analysis flow path.

An embodiment of a liquid chromatograph according to the invention includes the autosampler, a solvent delivery flow path, a feeding pump, an analysis flow path, an analysis column, a detector, and a liquid delivery management unit. A plurality of the solvent delivery flow paths are individually connected to the autosampler. The feeding pump feeds different solvents through the solvent delivery flow paths. The analysis flow path is connected to the autosampler and the analysis flow path is provided with the analysis column for separating the sample according to each component and the detector for detecting the sample components separated by the analysis column. The liquid delivery management unit controls the operation of the feeding pump to start a gradient feeding operation of changing the composition of the moving-phase liquid supplied to the analysis flow path in time in accordance with a predetermined program after ending the injection of the sample into the analysis flow path using the autosampler.

Advantageous Effects of the Invention

In the embodiment of the autosampler according to the invention, since the flow path switching mechanism includes the plurality of solvent supply ports which are individually connected to the plurality of solvent delivery flow paths feeding different solvents without any merging, the analysis port which is connected to the analysis flow path communicating with the analysis column for separating the sample, and the plurality of connection ports which include the loop one end side port connected to one end of the sample loop, the plurality of solvent delivery flow paths feeding different solvents can be connected to the flow path switching mechanism without using the mixer therebetween. Accordingly, the "delay capacity" of the gradient analysis decreases. Then, since the flow path switching mechanism switches the connection state between the connection ports to select any one of the loading mode for connecting all the solvent delivery flow paths to the analysis flow path without using the sample loop therebetween and the injecting mode for interposing the sample loop between all the solvent delivery flow paths and the analysis flow path, a plurality of different kinds of solvents are introduced into the analysis flow path without using the mixer therebetween and thus a time until a gradient is reflected in the moving-phase liquid flowing in the analysis flow path is shortened.

In the embodiment of the liquid chromatograph according to the invention, since the autosampler having a "small delay capacity" in the gradient analysis is used, a time until a gradient is reflected in the moving-phase liquid supplied to the analysis column is short and thus the analysis time is shortened.

MODE FOR CARRYING OUT THE INVENTION

Figure 1:
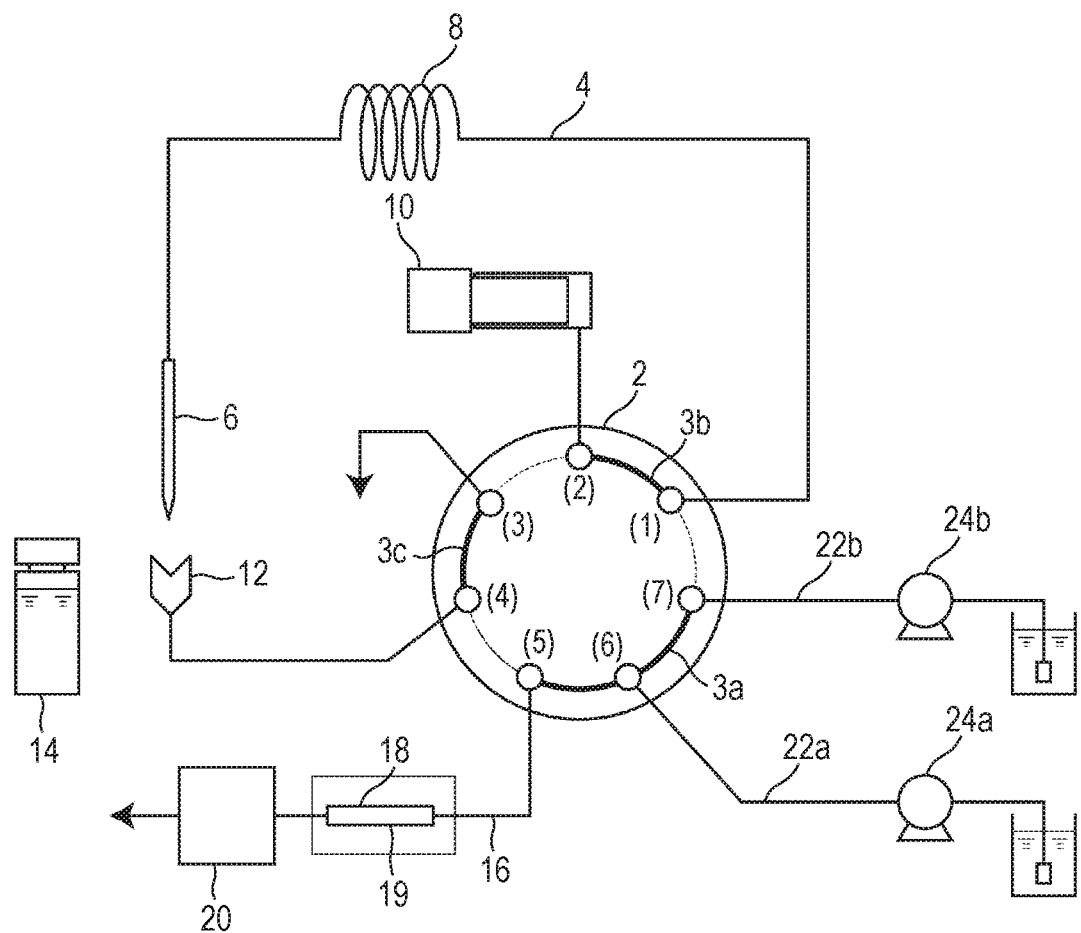
FIG. 1 is a flow path configuration diagram schematically illustrating an embodiment of a liquid chromatography.

As a flow path switching mechanism of an embodiment of an autosampler according to the invention, a rotary type valve switching a connection state between connection ports by rotating a rotor including a flow path communicating the connection ports with one another can be exemplified. In this case, a configuration is desirable in which solvent supply ports are adjacently arranged to form a series of solvent supply ports, a loop one end side port is disposed in the port at one end side of the series of solvent supply ports, an analysis port is disposed in the port at the other end side of the series of solvent supply ports, the series of solvent supply ports and the analysis port communicate with one another by one flow path provided in one rotor in a loading mode, and the series of solvent supply ports and the loop one end side port communicate with one another by one flow path in an injecting mode. Since the flow path configuration of the autosampler is simplified when the flow path switching mechanism has such a configuration, an increase in cost can be suppressed.

The above-described embodiment can be applied to a full injection type autosampler. In that case, the other end of a sample loop is connected to a proximal end of a needle. As the connection ports, the flow path switching mechanism includes an injection port provided at a position adjacent to the analysis port to be connected to the needle while a needle tip is inserted thereinto and a syringe port provided at a position adjacent to the loop one end side port to be connected to a syringe pump. The rotor includes a flow path which communicates the loop one end side port with the syringe port in the loading mode and a flow path which communicates the analysis port with the injection port in the injecting mode.

Further, the invention can be also applied to a partial injection type autosampler. In that case, as the connection ports, the flow path switching mechanism includes a loop other end side port provided at a position adjacent to the analysis port to be connected to the other end of the sample loop and an injection port provided at a position adjacent to the loop one end side port or the loop other end side port to be connected to the needle while the needle tip is inserted thereinto. The rotor includes a flow path which communicates the loop one end side port or the loop other end side port with the injection port in the loading mode and a flow path which communicates the analysis port with the loop other end side port in the injecting mode.

In a liquid chromatograph according to the invention, the autosampler includes a control unit configured to perform (1) a sample holding operation of holding a sample in the sample loop by setting the flow path switching mechanism in the loading mode, (2) a sample introducing operation of switching the flow path switching mechanism to the injecting mode after the end of the sample holding operation, interposing the sample loop between all the solvent delivery flow paths and an analysis column, and waiting until a predetermined time elapses as a time necessary for introducing the sample held by the sample loop into the analysis flow path, and (3) an analysis operation of switching the flow path switching mechanism to the loading mode after the end of the sample introducing operation and the liquid delivery management unit starts a gradient feeding operation after the analysis operation of the autosampler. When the flow path switching mechanism of the autosampler is switched to the loading mode, each of the solvent delivery flow paths is connected to the analysis flow path without using the sample loop. Thus, when the flow path switching mechanism is switched to the loading mode and the gradient feeding operation is started by the analysis operation in (3) at a timing in which the sample is introduced into the analysis flow path by the sample introducing operation of (2), the gradient feeding operation can be performed on the analysis flow path having the sample introduced thereinto without using the sample loop therebetween. Accordingly, the delay capacity from the feeding pump to the analysis column further decreases and thus the analysis time can be further shortened.

An embodiment of the autosampler and the liquid chromatograph according to the invention will be described with reference to the drawings. First, a flow path configuration of an embodiment of a liquid chromatograph including a full injection type autosampler will be described with reference to FIG. 1.

A rotary type high-pressure valve 2 (a flow path switching mechanism) including connection ports (1) to (7) (hereinafter, ports (1) to (7)) is provided. The ports (1) to (7) of the high-pressure valve 2 are evenly arranged on the same circumference.

A base end of a sampling flow path 4 is connected to the port (1) of the high-pressure valve 2 and a loop one end side port communicates with one end of a sample loop 8. The port (2) adjacent to the port (1) is a syringe port which is connected to a sucking/discharging port of the syringe pump 10. The port (3) adjacent to the port (2) is a drain port which communicates with a drain. The port (4) adjacent to the connection port (3) is provided with an injection port 12. The port (5) adjacent to the port (4) is an analysis port which is connected to an analysis flow path 16. A series of the ports (6) and (7) adjacent to the port (5) are solvent supply ports which are connected to solvent delivery flow paths 22a and 22b. The series of solvent supply ports (6) and (7) communicate with each other by a flow path 3a to be described later at all times. The port (7) is also adjacent to the port (1).

A rotor of the high-pressure valve 2 is provided with flow paths 3a, 3b, and 3c which are provided at an interval to communicate the adjacent connection ports. The flow path 3a has a length of communicating three connection ports with one another and the flow paths 3b and 3c have a length of communicating two connection ports with each other. The high-pressure valve 2 is a two-position valve which is located in any mode of a "loading mode" in which the ports (5), (6), and (7) communicate with one another by the flow path 3a, the ports (1) and (2) communicate with each other by the flow path 3b, and the ports (3) and (4) communicate with each other by the flow path 3c and an "injecting mode" in which the connection ports (6), (7), and (1) communicate with one another by the flow path 3a, the ports (2) and (3) communicate with each other by the flow path 3b, and the ports (4) and (5) communicate with each other by the flow path 3c.

A needle 6 is connected to a front end of the sampling flow path 4 and the sample loop 8 is provided at a proximal end side of the needle 6 on the sampling flow path 4. The needle 6 is held while its tip is directed downward in the vertical direction and is moved inward in the horizontal plane direction and the vertical direction by a needle drive mechanism (see FIG. 2). The analysis flow path 16 is provided with an analysis column 18 and a detector 20 in a direction from the high-pressure valve 2. The analysis column 18 is used to separate the sample according to each component and the sample components separated by the analysis column 18 are detected by the detector 20. The analysis column 18 is accommodated in a column oven 19 and a temperature thereof is controlled at a constant value.

The solvent delivery flow paths 22a and 22b are flow paths which feed different solvents by feeding pumps 24a and 24b. A mixer is not interposed between the solvent delivery flow paths 22a and 22b and the high-pressure valve 2 and the solvents fed by the solvent delivery flow paths 22a and 22b are merged and mixed inside the flow path 3a of the high-pressure valve 2.

Figure 2:
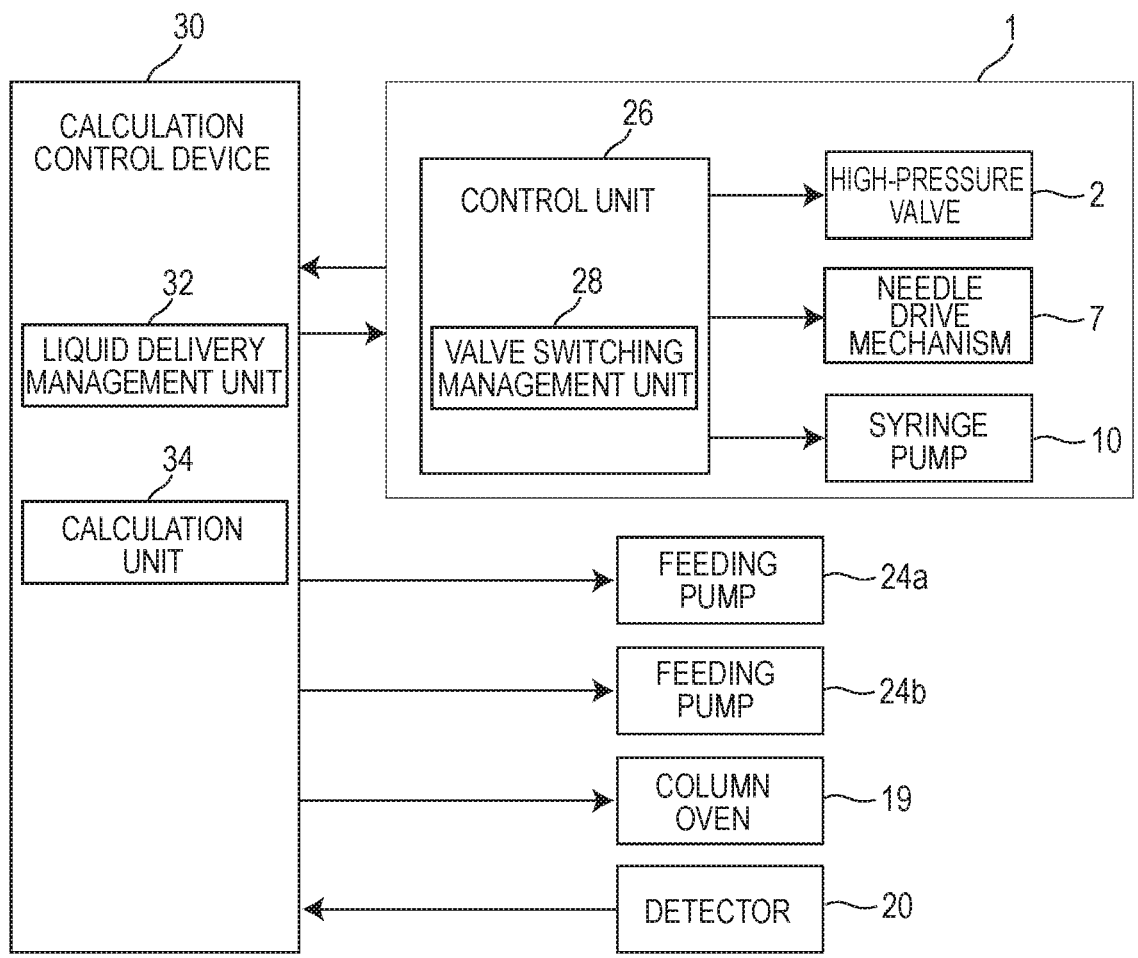
FIG. 2 is a block diagram schematically illustrating a configuration of the same embodiment.

In the liquid chromatograph of the embodiment, the high-pressure valve 2, the sampling flow path 4, the needle 6, the syringe pump 10, and the injection port 12 constitute an autosampler 1 (see FIG. 2). A sample container 14 which contains a sample is provided inside the autosampler 1 and the sample of the sample container 14 is automatically sampled by the needle 6 and is introduced into the analysis flow path 16 connected to the autosampler 1.

Next, an operation of the embodiment will be described with reference to a flowchart of FIG. 6 along with flow path configuration diagrams of FIGS. 3 to 5.

First, a standby state before obtaining the sample will be described. The standby state indicates a state where the tip of the needle 6 is inserted into the injection port 12 and the high-pressure valve 2 is in the injecting mode as illustrated in FIG. 4. In this standby state, the solvent delivery flow paths 22a and 22b are connected to the sampling flow path 4 through the flow path 3 of the high-pressure valve 2 and further the injection port 12 is connected to the analysis flow path 16 through the flow path 3c. The moving-phase liquid (for example, only aqueous solvent) having an initial composition in the gradient analysis and delivered from the solvent delivery flow paths 22a and 22b is fed to the analysis flow path 16 through the sampling flow path 4 as indicated by a bold line of FIG. 4 and the sampling flow path 4 and the analysis flow path 16 are filled with the moving-phase liquid having an initial composition.

Figure 3:
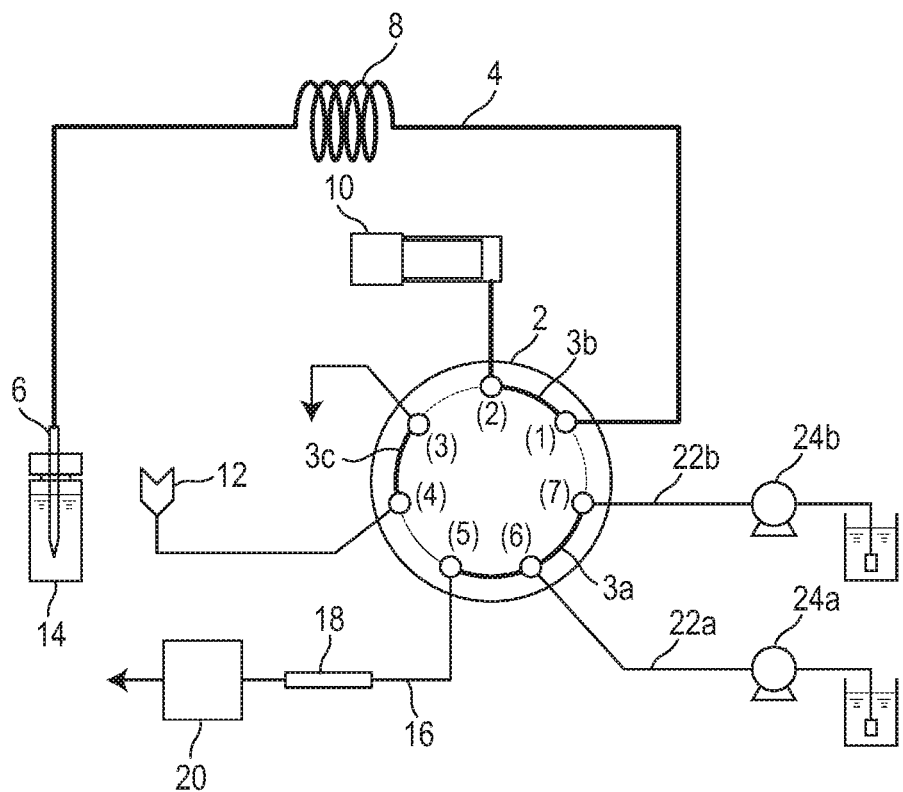
FIG. 3 is a flow path configuration diagram during sample sucking of the same embodiment.
Figure 4:
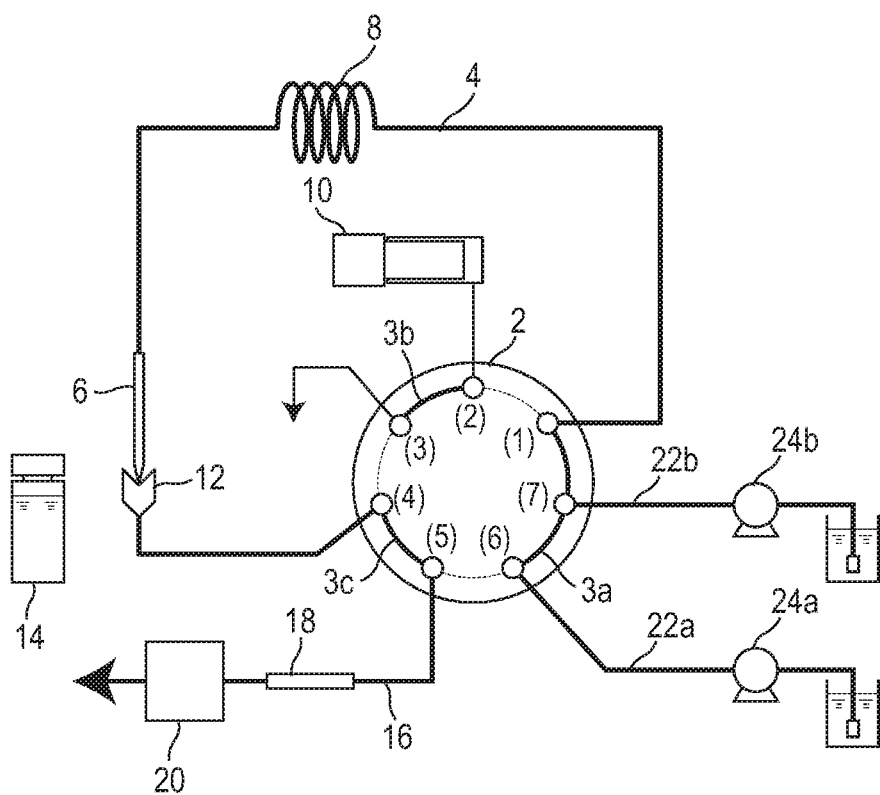
FIG. 4 is a flow path configuration diagram during sample introduction of the same embodiment.

At the timing of obtaining the sample, as illustrated in FIG. 3, the high-pressure valve 2 is switched to the loading mode so that the syringe pump 10 and the sampling flow path 4 are connected to each other by the flow path 3b. In this state, the needle 6 is moved and the tip is inserted into the sample container 14 serving as a sucking target so that the sample is sucked and the sample stays inside the sample loop 8. This is the sample sucking operation.

After the sample sucking operation, the needle 6 is moved to insert the tip of the needle 6 into the injection port 12 and the high-pressure valve 2 is switched to the injecting mode. When the high-pressure valve 2 is set to the injecting mode, the solvent delivery flow paths 22a and 22b and one end of the sampling flow path 4 are connected by the flow path 3a and the injection port 12 and the analysis flow path 16 are connected by the flow path 3c. Accordingly, the sampling flow path 4 is interposed between the solvent delivery flow paths 22a and 22b and the analysis flow path 16. In this state, as indicated by a bold line of FIG. 4, the moving-phase liquid having an initial composition in the gradient analysis is fed from the solvent delivery flow paths 22a and 22b and the sample staying in the sample loop 8 is introduced into the analysis flow path 16 by the moving-phase liquid. This is the sample introducing operation.

A time (hereinafter, referred to as a sample introduction time) until all samples staying in the sample loop 8 are introduced into the analysis flow path 16 after the high-pressure valve 2 is switched to the injecting mode is determined by the internal capacity from the injection port 12 to the analysis flow path 16, the sample sucking amount from the tip of the needle 6, and the moving-phase liquid feeding flow rate. Thus, the time can be obtained in advance by a calculation on the basis of the setting value of the sample sucking amount or the setting value of the moving-phase liquid feeding flow rate. A control unit 26 (see FIG. 2) provided in the autosampler 1 (see FIG. 2) includes a valve switching management unit 28 (see FIG. 2) which keeps the sample introduction time obtained in advance by a calculation and manages the switching timing of the high-pressure valve 2 so that the sample introducing operation is maintained until the sample introduction time elapses.

Figure 5:
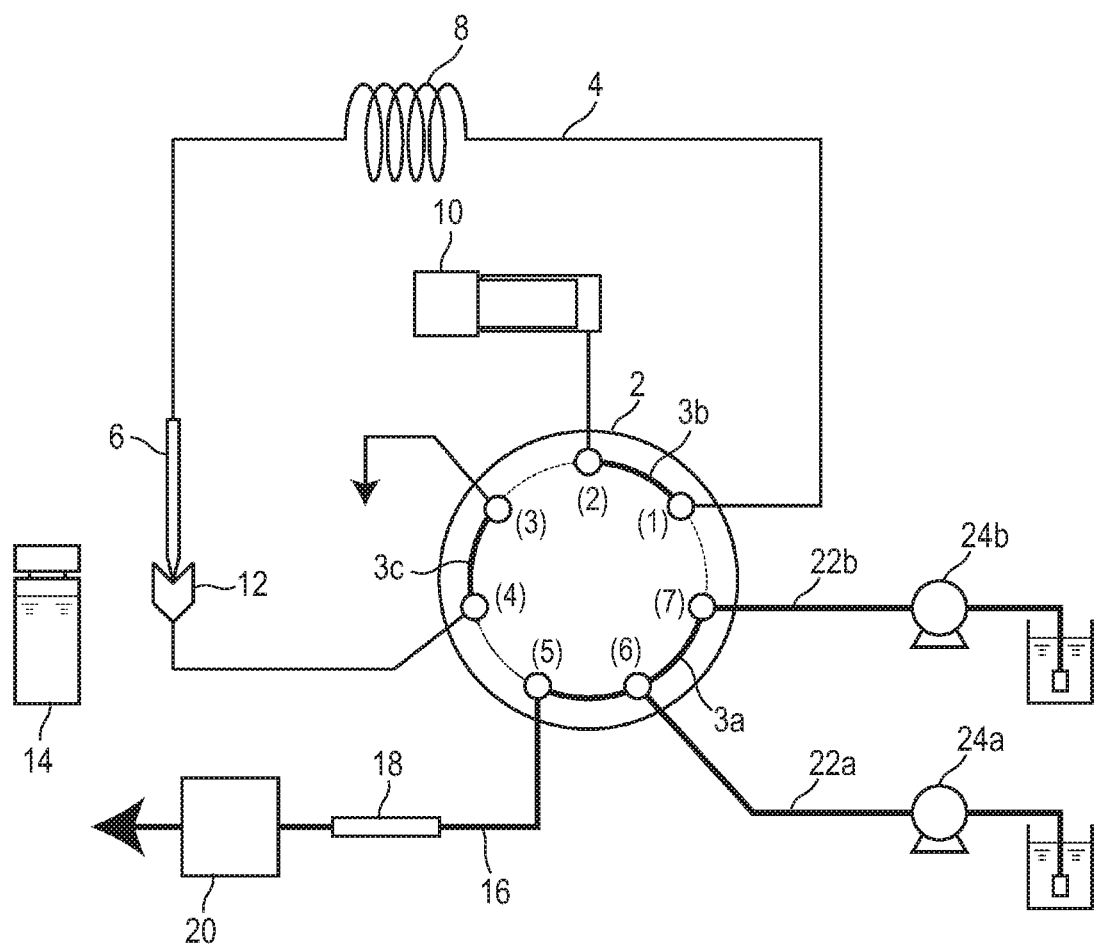
FIG. 5 is a flow path configuration diagram during analysis of the same embodiment.
Figure 6:
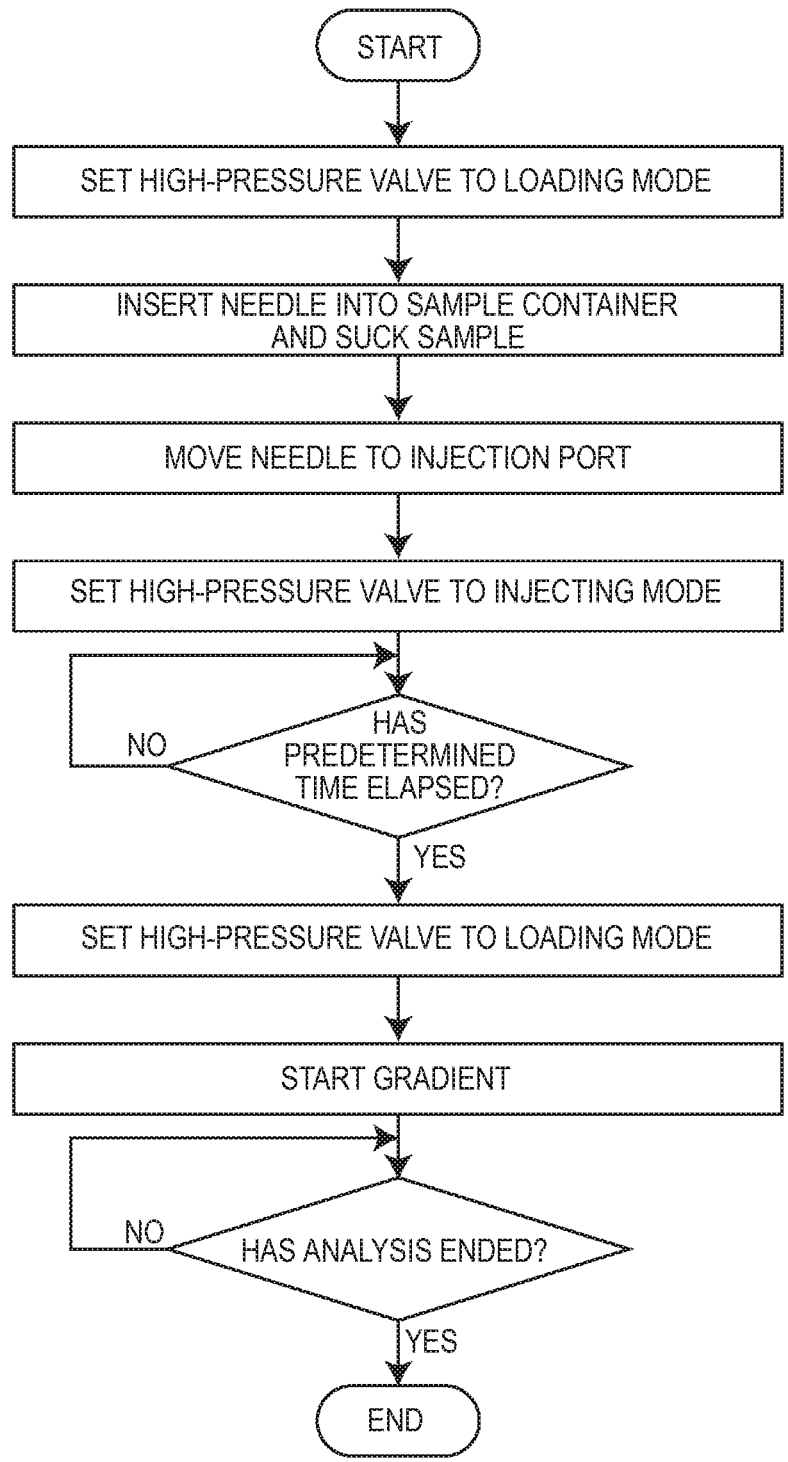
FIG. 6 is a flowchart illustrating an example of an operation of the same embodiment.

After the predetermined sample introduction time elapses from the start of the sample introducing operation, as illustrated in FIG. 5, the high-pressure valve 2 is switched to the loading mode and a gradient feeding operation for performing the gradient analysis is started at this timing. The gradient feeding operation indicates a feeding method of changing the composition of the moving-phase liquid in time by relatively changing the feeding speeds of the feeding pumps 24a and 24b in time.

In the flow path configuration of FIG. 5, since the mixer and the sampling flow path 4 are not interposed from the solvent delivery flow paths 22a and 22b to the analysis flow path 16, the delay capacity between the solvent delivery flow paths 22a and 24b and the analysis column 18 decreases and thus a time until the composition of the moving-phase liquid due to the gradient feeding operation is reflected in the moving-phase liquid flowing in the analysis column 18 is shortened. Accordingly, even when the moving-phase liquid feeding flow rate is small (for example, 100 μL/min or less), short-time analysis can be realized.

Additionally, in this embodiment, as described above, the gradient feeding operation is started by switching the high-pressure valve 2 to the loading mode after the sample is introduced into the analysis flow path 16, but such an operation does not need to be performed. That is, a configuration may be performed in which the tip of the needle 6 is inserted into the injection port 12, the gradient feeding operation is started immediately after the high-pressure valve 2 is switched to the injecting mode, and then the sample is analyzed. In this case, a delay time until the gradient feeding operation is reflected occurs by the amount of the sampling flow path 4 interposed between the solvent delivery flow paths 22a and 22b and the analysis flow path 16 compared to the case of starting the gradient feeding operation by switching the high-pressure valve 2 to the loading mode, but since the mixer for mixing the solvents fed by the feeding pumps 24a and 24b does not exist, the delay time is shorter than the conventional device.

An overall configuration of the embodiment will be described with reference to a block diagram of FIG. 2.

The autosampler 1 includes the control unit 26 which controls the operations of the high-pressure valve 2, the needle drive mechanism 7, and the syringe pump 10. The control unit 26 includes the valve switching management unit 28 which manages the switching timing of the high-pressure valve 2 in order to perform the sample sucking operation, the sample introducing operation, and the analysis operation.

The autosampler 1, the column oven 19, the detector 20, and the feeding pumps 24a and 24b are respectively and electrically connected to a common calculation control device 30. The calculation control device 30 is realized by, for example, a general personal computer or a dedicated computer such as a system controller. The calculation control device 30 controls the operations of the autosampler 1, the column oven 19, and the feeding pump 24a and 24b.

The calculation control device 30 is provided with a liquid delivery management unit 32 and a calculation unit 34. The liquid delivery management unit 32 controls the operations of the feeding pumps 24a and 24b to manage the composition of the moving-phase liquid supplied to the analysis flow path 16 on the basis of a predetermined gradient program. The calculation unit 34 performs various calculations including a chromatograph creating operation based on a detection signal obtained by the detector 20. The liquid delivery management unit 32 and the calculation unit 34 are functions which can be obtained when a microcomputer provided in the calculation control device 30 executes a program stored in a storage device of the device 30.

Figure 7:
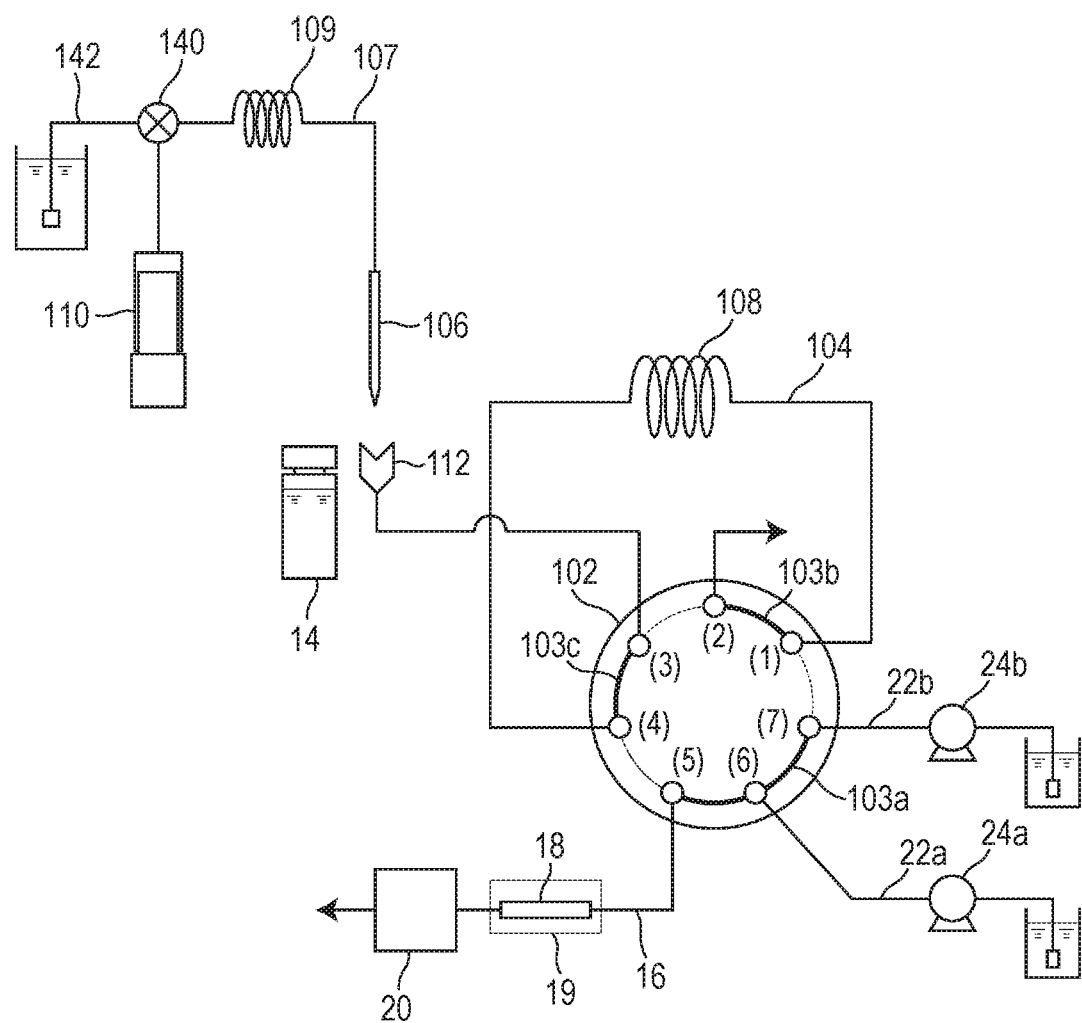
FIG. 7 is a flow path configuration diagram schematically illustrating another embodiment of a liquid chromatograph.

Next, an embodiment of a liquid chromatograph including a partial injection type autosampler will be described with reference to the drawings. First, a flow path configuration of the same embodiment will be described with reference to FIG. 7.

A rotary type high-pressure valve 102 (a flow path switching mechanism) including ports (1) to (7) is provided. The ports (1) to (7) of the high-pressure valve 102 are evenly arranged on the same circumference.

The port (1) of the high-pressure valve 102 is a loop one end side port which is connected to one end of a sample holding flow path 104 and communicates with one end of a sample loop 108. The other end of the sample holding flow path 104 is connected to the port (4). The port (4) constitutes the loop other end side port. The sample holding flow path 104 is provided with the sample loop 108. The port (2) adjacent to the port (1) is a drain port. The port (3) adjacent to the port (2) is provided with an injection port 112. The port (5) adjacent to the port (4) is an analysis port connected to the analysis flow path 16. A series of the ports (6) and (7) adjacent to the port (5) are solvent supply ports which are connected to the solvent delivery flow paths 22a and 22b. The series of the ports (6) and (7) communicate with each other at all times by a flow path 103a to be described later. The analysis flow path 16 and the solvent delivery flow paths 22a and 22b are the same as those of the above-described embodiment.

A rotor of the high-pressure valve 102 is provided with flow paths 103a, 103b, and 103c which are provided at an interval to communicate the adjacent connection ports with one another. The flow path 103a has a length of communicating three connection ports with one another and the flow paths 103b and 103c have a length of communicating two connection ports with each other. The high-pressure valve 102 is a two-position valve which is located in any mode of a "loading mode" in which the connection ports (5), (6), and (7) communicate with one another by the flow path 103a, the ports (1) and (2) communicate with each other by the flow path 103b, and the ports (3) and (4) communicate with each other by the flow path 103c and an "injecting mode" in which the connection ports (6), (7), and (1) communicate with one another by the flow path 103a, the ports (2) and (3) communicate with each other by the flow path 103b, and the ports (4) and (5) communicate with each other by the flow path 103c.

A needle 106 which sucks the sample from the sample container 14 provided inside the autosampler 100 (see FIG. 8) is provided. The needle 106 is moved inward in the horizontal plane direction and the vertical direction by a needle drive mechanism 105 (see FIG. 8) while its tip is directed downward in the vertical direction. A sampling flow path 107 is connected to a proximal end of the needle 106. The sampling flow path 107 is connected to a syringe pump 110 through an electromagnetic valve 140. A cleaning liquid supply flow path 142 for a cleaning liquid is also connected to the electromagnetic valve 140 and a connection destination of the syringe pump 110 is switched between the sampling flow path 107 and the cleaning liquid supply flow path 142 by the electromagnetic valve 140. The sampling flow path 107 is provided with a sample loop 109 which holds the sample sucked from the tip of the needle 106.

The analysis flow path 16 and the solvent delivery flow paths 22a and 22b are similar to those of the embodiment described with reference to FIGS. 1 to 6 and herein a description thereof will be omitted.

An operation of this embodiment will be described with reference to FIGS. 9 to 11.

Figure 9:
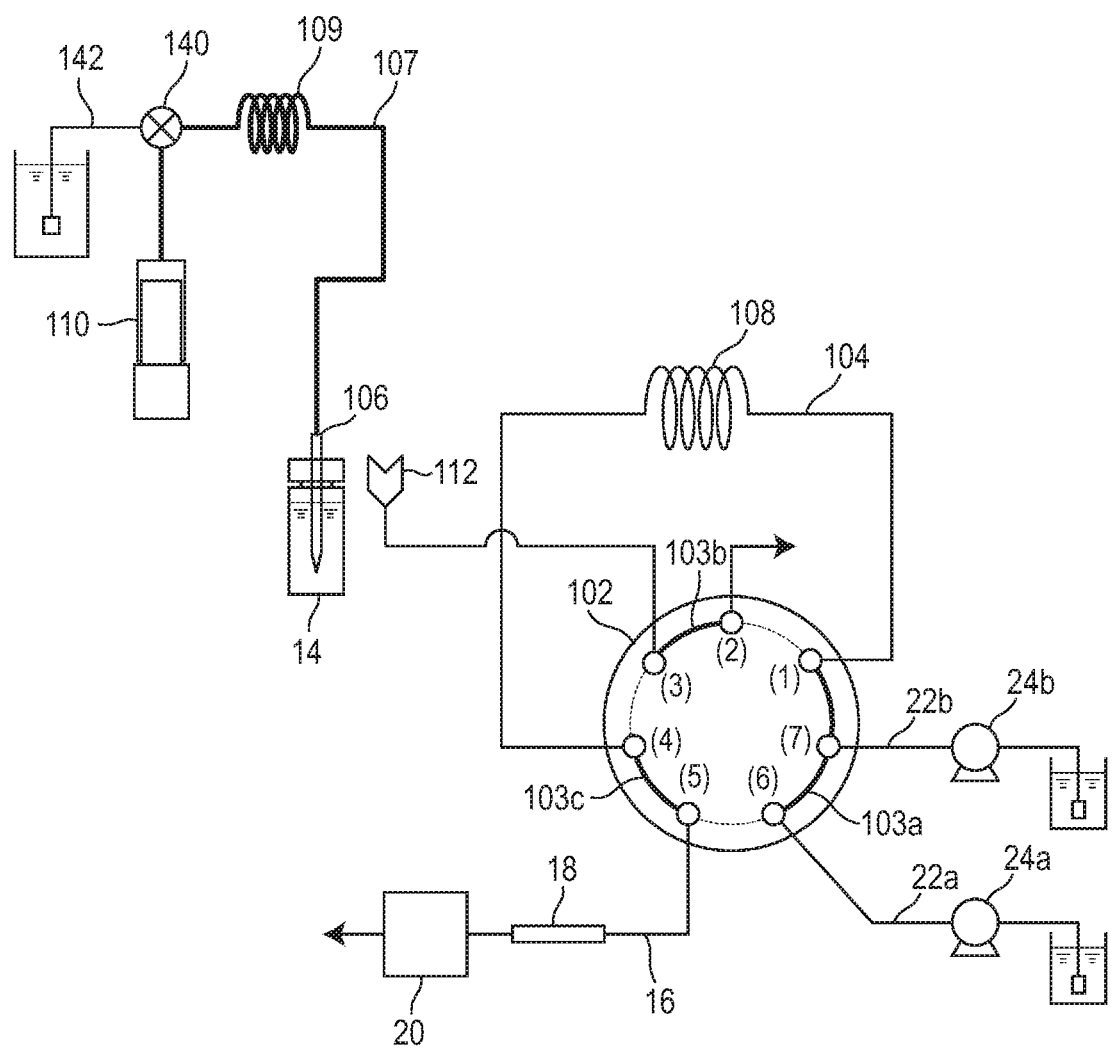
FIG. 9 is a flow path configuration diagram during sample sucking of the same embodiment.

First, as illustrated in FIG. 9, the tip of the needle 106 is inserted into the sample container 14 and the syringe pump 110 is sucked and driven so that the sample stays in the sample loop 109. At this time, the high-pressure valve 102 is switched to the injecting mode and the sample holding flow path 104 is filled with the moving-phase liquid having an initial composition in the gradient analysis.

Figure 10:
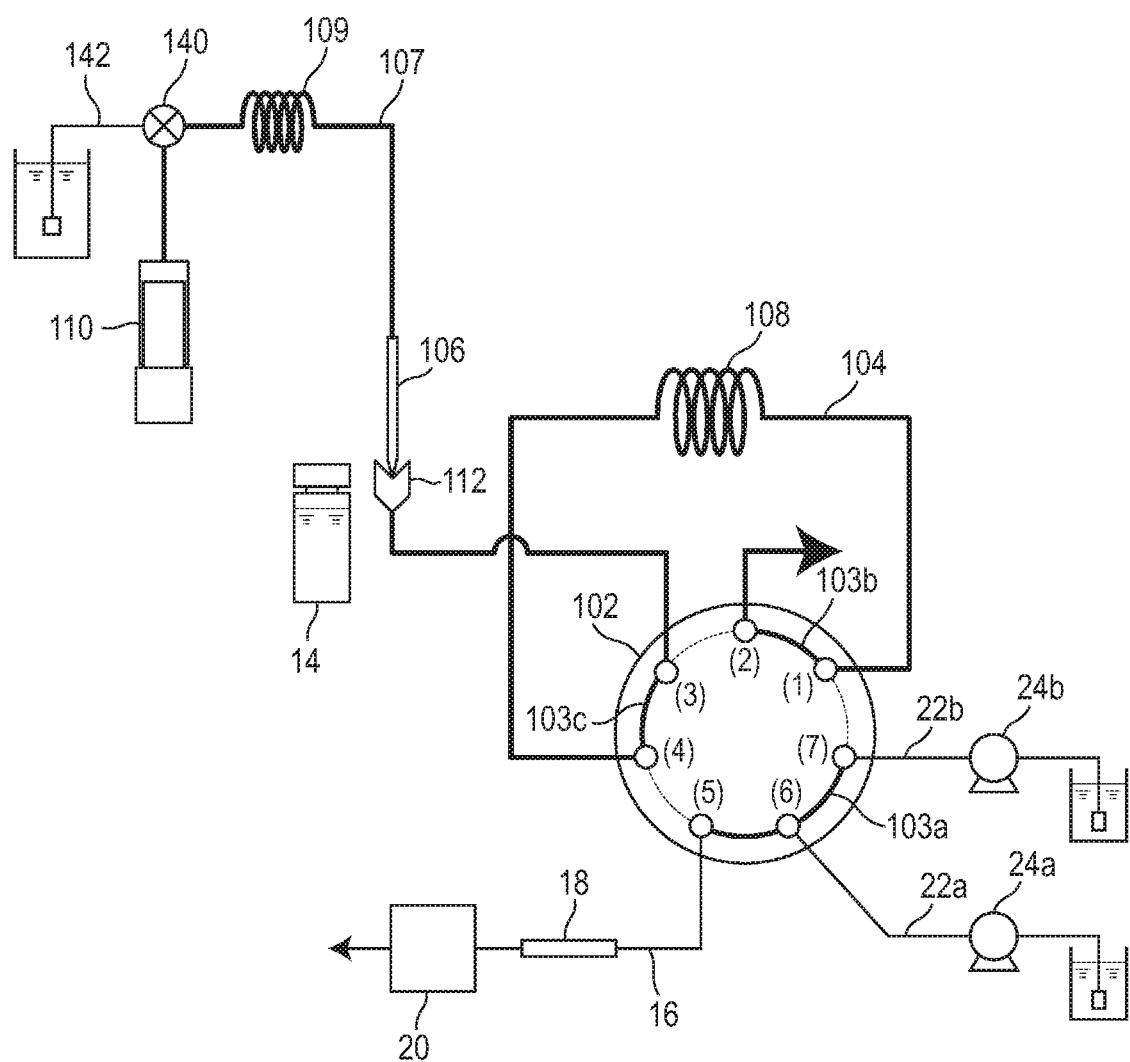
FIG. 10 is a flow path configuration diagram during sample injection of the same embodiment.
Figure 11:
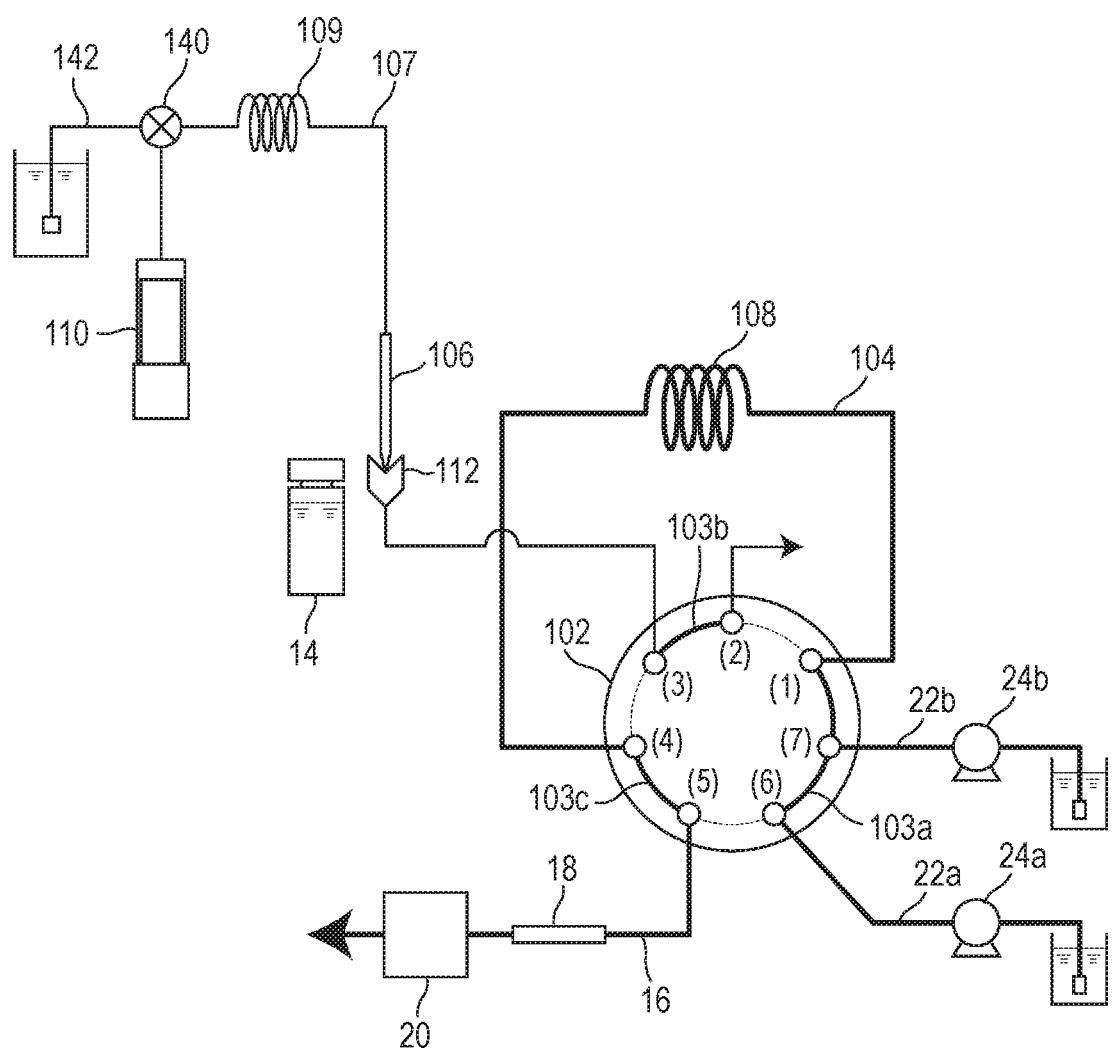
FIG. 11 is a flow path configuration diagram during sample introduction of the same embodiment.

Next, the tip of the needle 106 is inserted into the injection port 112 and the high-pressure valve 102 is switched to the loading mode so that a predetermined amount of the sample is injected into the sample loop 108 by the discharge driving of the syringe pump 110 as indicated by a bold line in FIG. 10. This is the sample sucking operation.

After the sample is injected into the sample loop 108, the high-pressure valve 102 is switched to the injecting mode. Accordingly, the sample holding flow path 104 is interposed between the solvent delivery flow paths 22a and 22b and the analysis flow path 16 and the sample of the sample loop 108 is introduced into the analysis flow path 16 by the moving-phase liquid from the solvent delivery flow paths 22a and 22b as indicated by a bold line in FIG. 11. This is a sample introducing operation.

Here, in the partial injection type autosampler 100 (see FIG. 8) used in this embodiment, the capacity of the sample loop 108 is extremely smaller than that of the full injection type sample loop (the sample loop 8 in FIG. 1). For that reason, even when the gradient feeding operation is started at the time of switching the high-pressure valve 102 to the injecting mode in the sample introducing operation, the delay time until the gradient feeding operation using the sample holding flow path 104 is reflected is short.

Further, also in this embodiment, similarly to the full injection type, the high-pressure valve 102 may be switched to the loading mode after a predetermined time necessary until the sample is introduced into the analysis flow path 16 elapses from the start of the sample introducing operation and then the gradient feeding operation may be started. Then, since the moving-phase liquid delivered from the solvent delivery flow paths 22a and 22b can be fed to the analysis flow path 16 without using the sample holding flow path 104, the delay time can be further shortened.

Figure 8:
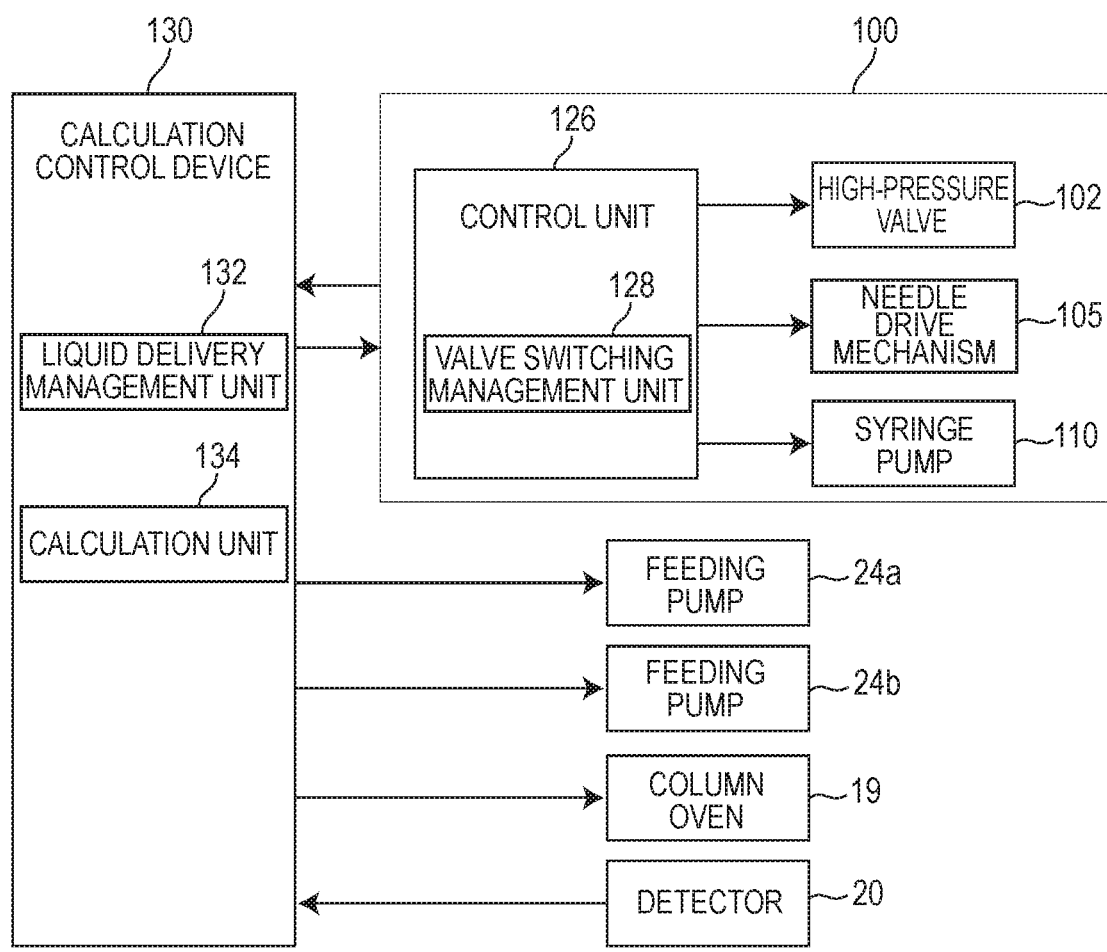
FIG. 8 is a block diagram schematically illustrating a configuration of the same embodiment.

An overall configuration of the embodiment is similar to that of the above-described full injection type. That is, as illustrated in FIG. 8, the autosampler 100 includes a control unit 126 which controls the operations of a high-pressure valve 102, a needle drive mechanism. 105, and a syringe pump 110. The control unit 126 includes a valve switching management unit 128 which manages a switching timing of the high-pressure valve 102 in order to perform the above-described operation.

The autosampler 100, the column oven 19, the detector 20, and the feeding pumps 24a and 24b are respectively and electrically connected to the common calculation control device 130. The calculation control device 130 is provided with a liquid delivery management unit 132 and a calculation unit 134 and the calculation control device 130 performs the management of the composition of the moving-phase liquid supplied to the analysis flow path 16 or various calculations based on the detection signal obtained by the detector 20.

REFERENCE SIGNS LIST 1, 100 Autosampler
2, 102 High-pressure valve (flow path switching mechanism)
3a, 3b, 3c, 103a, 103b, 103c Flow path provided in rotor
4, 107 Sampling flow path
6, 106 Needle
7, 105 Needle drive mechanism
8, 108, 109 Sample loop
10, 110 Syringe pump
12, 112 Injection port
14 Sample container
16 Analysis flow path
18 Analysis column
19 Column oven
20 Detector
22a, 22b Solvent delivery flow path
24a, 24b Feed pump
26, 126 Control unit
28, 128 Valve switching management unit
30, 130 Calculation control device
32, 132 Liquid delivery management unit
34, 134 Calculation unit

The invention claimed is:

1. An autosampler comprising:
a needle;
a syringe pump which sucks and discharges a sample through the needle;
a needle drive mechanism which moves the needle;
a sample loop which holds the sample sucked by the syringe pump; and
a flow path switching mechanism which includes a plurality of connection ports, the plurality of connection ports including a plurality of solvent supply ports individually connected to a plurality of solvent delivery flow paths feeding different solvents without any merging, an analysis port connected to an analysis flow path communicating with an analysis column for separating the sample, and a loop one end side port connected to one end of the sample loop, and the flow path switching mechanism being configured to switch a connection state between the connection ports to select any one of a loading mode for connecting all the solvent delivery flow paths to the analysis flow path in the same time without using the sample loop therebetween and an injecting mode for connecting all the solvent delivery flow paths to the analysis flow path at the same time through the sample loop by interposing the sample loop between all the solvent delivery flow paths and the analysis flow path,
wherein the flow path switching mechanism is a rotary type valve which switches a connection state between the connection ports by rotating a rotor including a flow path communicating the connection ports, the solvent supply ports are adjacently arranged to form a series of solvent supply ports, the loop one end side port is disposed at one end side of the series of solvent supply ports, the analysis port is disposed at the other end side of the series of solvent supply ports, the series of solvent supply ports and the analysis port communicate with one another by one flow path provided in the rotor in the loading mode, and the series of solvent supply ports and the loop one end side port communicate with one another by the one flow path in the injecting mode.

2. The autosampler according to claim 1,
wherein the other end of the sample loop is connected to a proximal end of the needle, and
wherein the flow path switching mechanism includes an injection port which is provided at a position adjacent to the analysis port to be connected to the needle while the needle tip is inserted thereinto and a syringe port which is provided at a position adjacent to the loop one end side port to be connected to the syringe pump as the connection ports and the rotor includes a flow path which communicates the loop one end side port with the syringe port in the loading mode and a flow path which communicates the analysis port with the injection port in the injecting mode.

3. The autosampler according to claim 1,
wherein the flow path switching mechanism includes a loop other end side port which is provided at a position adjacent to the analysis port to be connected to the other end of the sample loop and an injection port which is provided at a position adjacent to the loop one end side port or the loop other end side port to be connected to the needle while the needle tip is inserted thereinto as the connection ports and the rotor includes a flow path which communicates the loop one end side port or the loop other end side port with the injection port in the loading mode and a flow path which communicates the analysis port with the loop other end side port in the injecting mode.

4. A liquid chromatograph comprising:
the autosampler according to claim 1;
a plurality of solvent delivery flow paths which are connected to the autosampler;
a plurality of feeding pumps which feed different solvents through the solvent delivery flow paths;
an analysis flow path which is connected to the autosampler;
an analysis column which is provided in the analysis flow path to separate the sample according to each component;
a detector which is provided at the downstream side of the analysis column in the analysis flow path and detects the sample components separated by the analysis column; and
a liquid delivery management unit which controls an operation of the feeding pump to start a gradient feeding operation of changing a composition of a moving-phase liquid supplied to the analysis flow path in time in accordance with a predetermined program after ending the injection of the sample into the analysis flow path using the autosampler.

5. The liquid chromatograph according to claim 4,
wherein the autosampler includes a control unit which performs a sample holding operation of holding the sample in the sample loop by setting the flow path switching mechanism in the loading mode, a sample introducing operation of switching the flow path switching mechanism to the injecting mode after the end of the sample holding operation, interposing the sample loop between all the solvent delivery flow paths and the analysis column, and waiting until a predetermined time elapses as a time necessary for introducing the sample held by the sample loop into the analysis flow path, and an analysis operation of switching the flow path switching mechanism to the loading mode after the end of the sample introducing operation, and
wherein the liquid delivery management unit starts the gradient feeding operation after the analysis operation of the autosampler.

* * * * *